Figures 1, 2:
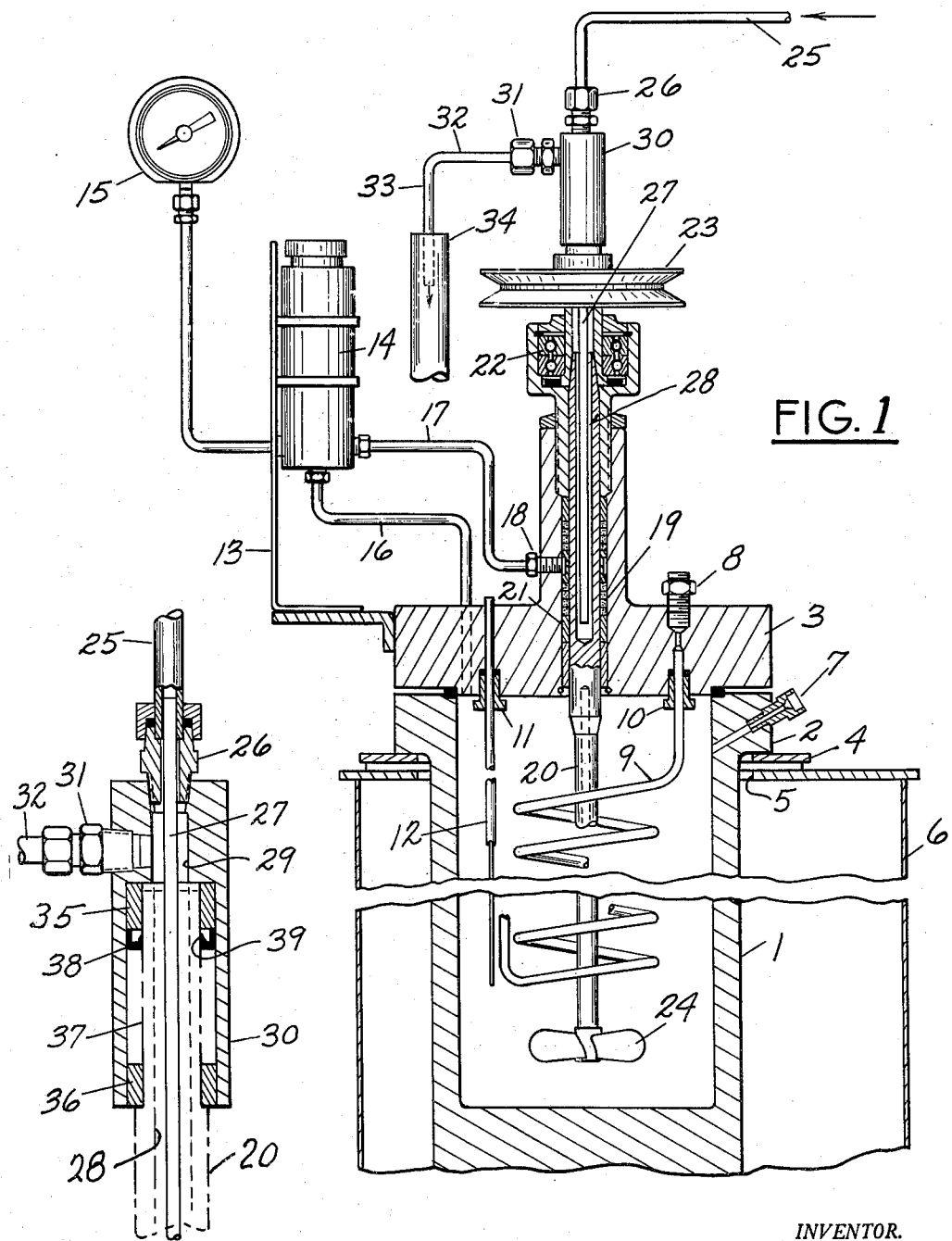

INVENTOR.
Fred Gasche
BY Ralph Hammar
Attorney

2,991,161
AUTOCLAVE
Fred Gasche, Erie, Pa., assignor to Autoclave Engineers, Inc., Erie, Pa., a corporation of Pennsylvania
Filed Nov. 23, 1959, Ser. No. 854,632
2 Claims. (Cl. 23—290)

In high pressure autoclaves for chemical research and the like, access to the reaction products at the end of each run is obtained by taking off the cover. This has heretofore involved disconnecting fluid fittings in addition to unbolting the cover. This invention eliminates the need for disconnecting fittings in the line supplying cooling water for the agitator shaft.

In the drawing, FIG. 1 is a section through an autoclave, and FIG. 2 is a section through the seal assembly for supplying cooling water to the agitator shaft.

In the drawing, 1 indicates the body of a pressure vessel or autoclave having at its upper end an outwardly projecting flange 2 which provides a bolt circle for a cover 3. The flange 2 rests on the rim 4 of an opening 5 in a base 6.

Distributed around the flange are a number of fittings such as indicated at 7 which may be used for various purposes such as the supply of gas under high pressure to the autoclave or the connection of safety devices such as over-pressure release. Fittings such as indicated at 7 must withstand the full operating pressure of the autoclave and it is desirable that these remain connected for long periods of time.

At the end of each run, access to the reaction products is obtained by removing the cover 3. The frequency of removal depends upon the character of the research but it is not unusual for the cover to be removed several times a day. In the present construction, the cover removal requires a minimum of disturbance of associated parts. There are fittings in the cover, such as illustrated at 8, for connection to opposite ends of a heat exchange coil 9. The fittings 8 are connected to a low pressure source of heat exchange liquid since the heat exchange liquid is not subject to the full operating pressure. Fittings such as 10 for connecting the ends of the heat exchange coil to the underside of the cover are subject to the full operating pressure. While the connection to the low pressure fittings 8 may be broken when the cover is removed, this is a relatively simple operation. The high pressure fitting 10 need not be disconnected. Also mounted on the underside of the cover are a number of fittings, such as illustrated at 11, for connection to devices 12 for various purposes such as the sampling or determining of the temperature of the reaction products. These are permanently fastened to the cover. Also mounted on the cover is a bracket 13 supporting an oil cylinder 14 and a pressure gage 15. The operating pressure within the autoclave is conducted by a tube 16 extending through the cover to the upper part of the oil cylinder 14. The pressure in the oil is transmitted to the pressure gage 15 and is also transmitted through a tube 17 to a fitting 18 which supplies oil at the operating pressure to the center of packing 19 surrounding an agitator shaft 20. The shaft is journaled at its lower end in a sleeve bearing 21 and at its upper end in ball bearings 22 and is driven by a pulley 23 and rotates an impeller 24 at a speed sufficient to produce the desired agitation.

At the high operating pressures involved, there is substantial heat generated by friction between the shaft and packing which is removed by water cooling the shaft. The supply of cooling water to the agitator shaft is a difficult and troublesome problem. Access to the shaft must be through the unsupported upper end of the shaft and misalignment of a water supply fitting fixed to the shaft could cause an undesirable wobbling movement which would introduce seal and bracing problems. These problems are overcome by the present construction. The cooling water is supplied through a flexible tube 25 connected to a fitting 26 at the upper end of a metal tube 27 which depends close to the bottom of a counter bore 28 in the upper end of the shaft. The cooling water flows down through the tube 27 into the portion of the counter bore opposite the packing and back up through the annular space between the tube and the counter bore to a chamber 29 at the upper end of the seal assembly housing 30. Leading from the chamber is a discharge fitting 31 connected to a discharge line 32 having a downwardly bent end 33 depending into a drain line 34. The discharge line 32 is purposely made much larger than the inlet 27 so that there is very little back pressure in the chamber 29. The seal assembly housing is supported by upper and lower bearing sleeves 35, 36 journaled on the projecting upper end 37 of the agitator shaft 20. The depending end 33 of the drain line 32 prevents rotation of the seal assembly housing as the shaft turns. Below the upper bearing 35 is a rubber seal 38 having a lip 39 which makes sealing engagement with the shaft and prevents leakage of the shaft cooling water. The bearing sleeves 35, 36 maintain perfect alignment between the seal housing 30 and the shaft 20, eliminating any wobble. The alignment also eliminates stress on the seal 38.

Connection of the cooling water to the shaft is made by dropping the seal assembly housing 30 in place on the upper end 37 of the shaft. As the housing slips into place, the depending end 33 of the discharge line is received in the drain line 34 holding the housing against rotation and at the same time establishing the drain connection. At the end of a run, the housing is merely lifted off the upper end of the shaft. After relieving the pressure within the autoclave, access to the reaction products is obtained by removing the cover.

What is claimed as new is:
1. In an autoclave having a cover with a vertical agitator shaft journaled therein, packing for the shaft carried by the cover, the upper end of the shaft projecting above the cover and provided with a counter bore extending from the upper end of the shaft to the region opposite the packing, a drive pulley non rotatably fixed to the shaft above the cover, a cooling liquid assembly comprising a housing above the pulley having bearings slidably received on the projecting upper end of the shaft for supporting the housing on the shaft, a seal within the housing engaging the shaft, an inlet fitting at the upper end of the housing connected to a supply of cooling liquid, a tube of smaller diameter than said counter bore depending from said fitting into the counter bore and discharging liquid to the counter bore in the region opposite the packing, a discharge fitting having a tube leading from said housing above the seal and provided with a depending end, and a drain line receiving the depending end of said drain tube.

2. In an autoclave having a cover with a vertical agitator shaft journaled therein, packing for the shaft carried by the cover, the upper end of the shaft projecting above the cover and provided with a counter bore extending from the upper end of the shaft to the region opposite the packing, a drive pulley non rotatably fixed to the shaft above the cover, a cooling liquid assembly comprising a housing having bearings slidably received on the projecting upper end of the shaft for supporting the housing on the shaft, a seal within the housing engaging the shaft, an inlet fitting at the upper end of the housing connected to a supply of cooling liquid, a tube of smaller diameter than the counter bore depending from said fitting into the counter bore and discharging liquid to the counter bore in the region opposite the packing, a drain line, and a discharge fitting having a connection to the housing above the seal for limiting the back pressure in the housing.

References Cited in the file of this patent

UNITED STATES PATENTS

| | | |
|---|---|---|
| 896,551 | Jurgens | Aug. 18, 1908 |
| 2,165,253 | Graves | July 11, 1939 |
| 2,806,364 | Wilson | Sept. 17, 1957 |